Patented Mar. 10, 1942

2,276,234

UNITED STATES PATENT OFFICE 2,276,234

METHOD OF TREATING SEED

Franklin D. Jones, Upper Darby, Pa., assignor to American Chemical Paint Company, Ambler, Pa., a corporation of Delaware No Drawing. Application January 31, 1938, Serial No. 187,933

2 Claims. (Cl. 47—58)

This invention relates to methods of treating seed, and concerns itself particularly with methods of treating seed before planting or sowing for the eradication of fungus and the improvement of germination.

The primary object of the invention is to provide a relatively simple and inexpensive and exceptionally effective method of treating seed for the above stated purpose.

The invention is based upon the observation that phenyl, naphthyl (alpha naphthalene), and indole acetic, propionic and butyric acids, their lower alkyl esters and alkali metal salts, which for some time have been considered as being plant hormones or growth promoters, do exert growth promoting influences on normal plants, but appear to have an inhibitive effect on the type of parasitic plant generally termed fungi.

The plant hormones given in the foregoing list are effective against fungi and diseases due to fungi even in such dilute concentrations as 1 part of hormone in 250,000 parts of composition, the rest of the composition being either a solvent or an inert filler. The preferred concentrations for practical use range from 1 part of hormone in 50,000 parts of composition to 1 part in 100,000 parts. This range of concentration is sufficient for the eradication of fungi and the diseases they cause without harming the plant itself. In fact, the plant hormones appear to have a stimulating effect on the plant itself.

The naphthyl substituted acids appear to be the most effective as fungi inhibitors, the indole substituted acids come next and finally the phenyl substituted acids. The salts are about as effective as the acids, and the effectiveness of the esters appears to decrease with increasing molecular weights. As examples of suitable salts may be mentioned the sodium, potassium and ammonium salts of each of the aforementioned acids. As examples of suitable esters may be mentioned the methyl, ethyl and isopropyl esters.

The fungicidal compositions to be used in carrying out the method of the invention may be made up ready for use by dissolving the plant hormone in a suitable solvent or by mixing it with an inert filler or carrier. The salts are soluble in water, and water therefore affords an excellent vehicle for the fungicide. The acids and esters should first be dissolved in a small quantity of ethyl alcohol and then diluted with water to the desired concentration. The inert filler or carrier, which may be employed instead of a solvent, may be talc or a clay such as bentonite.

When made up in the form of a solution, the fungicide may advantageously have incorporated therewith a wetting agent to facilitate penetration of the fungi by the composition. As examples of suitable wetting agents may be mentioned sulphonated alcohols of the fatty series having from eight to thirty carbon atoms. The wetting agent may be present in about ten parts to 100,000 parts of composition. Of the other 99,990 parts, one or two parts may be the plant hormone and the remainder may be the solvent.

A suitable dry composition may contain one or two parts of hormone in powdered crystalline form and about 99,998 parts of a dry inert filler such as talc or a clay such as bentonite.

A very effective way to treat the seed is to soak them in a fungicidal solution for about twenty-four hours. Not only does this treatment rid the seed of spores of fungi, but it also greatly improves the germination. The seeds after treatment may be dried sufficiently to permit them to be handled in sowing. Instead of soaking the seed in a fungicidal solution, the seed may be dusted with the dry composition.

The method of the invention, in addition to being relatively simple and inexpensive and exceptionally effective, has the decided advantage over previously used and suggested methods of treating seed in that it does not require the use of fungicides which are toxic to animal and plant life. The plant hormones, which constitute the essential ingredient of the composition used in the method of the invention, are relatively unstable, particularly in the presence of light and air. After their work of eradicating the fungus is finished, they deteriorate into substances which are innocuous to animal and plant life.

The foregoing specification and description include the essential and distinctive thought of my invention, but it is to be distinctly understood that the same may be modified in various ways and combined with various other details without affecting the peculiar results obtained.

I claim:

1. A method of treating seed before planting for the eradication of fungus and the improvement of germination, which consists in treating the seed with a fungicidal composition containing as the essential ingredient thereof one part of a substance selected from the group consisting of phenyl, naphthyl, and indole acetic, propionic and butyric acids, their lower alkyl esters and alkali metal salts, in from 50,000 to 100,000 parts of the composition.

2. A method of treating seed before planting for the eradication of fungus and the improvement of germination, which consists in treating the seed with a fungicidal composition containing as the essential ingredient thereof a substance selected from the group consisting of phenyl, naphthyl, and indole acetic, propionic and butyric acids, their lower alkyl esters and alkali metal salts.

FRANKLIN D. JONES.